US011982252B2

(12) United States Patent
Jones

(10) Patent No.: US 11,982,252 B2
(45) Date of Patent: May 14, 2024

(54) FUEL PUMP ASSEMBLY

(71) Applicant: DELPHI TECHNOLOGIES IP LIMITED, St. Michael (BB)

(72) Inventor: David Jones, London (GB)

(73) Assignee: PHINIA Delphi Luxembourg SARL, Belvaux (LU)

( * ) Notice: Subject to any disclaimer, the term of this patent is extended or adjusted under 35 U.S.C. 154(b) by 0 days.

(21) Appl. No.: 18/036,007

(22) PCT Filed: Nov. 10, 2021

(86) PCT No.: PCT/EP2021/081302
§ 371 (c)(1),
(2) Date: May 9, 2023

(87) PCT Pub. No.: WO2022/101301
PCT Pub. Date: May 19, 2022

(65) Prior Publication Data

US 2023/0323845 A1 Oct. 12, 2023

(30) Foreign Application Priority Data

Nov. 10, 2020 (GB) ..................................... 2017720

(51) Int. Cl.
*F02M 55/04* (2006.01)
*F02M 59/10* (2006.01)
(Continued)

(52) U.S. Cl.
CPC .......... *F02M 55/04* (2013.01); *F02M 59/102* (2013.01); *F02M 59/30* (2013.01);
(Continued)

(58) Field of Classification Search
CPC ...... F02M 55/04; F02M 59/102; F02M 59/30; F02M 59/44; F02M 2200/31; F02M 2700/1376; F02M 2700/1388
(Continued)

(56) References Cited

U.S. PATENT DOCUMENTS 4,211,119 A * 7/1980 Wolber ................. G01L 9/0022 123/445
6,095,774 A * 8/2000 Tanaka ............... F02M 63/0225 417/540
(Continued)

FOREIGN PATENT DOCUMENTS

DE 19531873 C1 11/1996
GB 2304830 A 3/1997

OTHER PUBLICATIONS

International Search Report for PCT/EP2021/081302 dated Mar. 1, 2022, 2 pages.

*Primary Examiner* — Logan M Kraft
*Assistant Examiner* — John D Bailey
(74) *Attorney, Agent, or Firm* — Warner Norcross + Judd LLP

(57) ABSTRACT

A fuel pump assembly comprises a plunger arranged to reciprocate within a plunger bore via a drive shaft, to perform a pumping cycle comprising a pumping stroke and a return stroke, the pumping stroke comprising movement of the plunger from a bottom dead centre (BDC) position to a top dead centre (TDC) position, and the return stroke comprising movement of the plunger from the TDC position to the BDC position. The fuel pump assembly comprises a spring assembly including a return spring that is cooperable, at a first end, with a first member coupled to the plunger and movable at a first speed dependent on the speed of rotation of the drive shaft and, at a second end, with a second
(Continued)

member which is movable at a damped speed relative to the first speed.

10 Claims, 6 Drawing Sheets

(51) Int. Cl.
*F02M 59/30* (2006.01)
*F02M 59/44* (2006.01)

(52) U.S. Cl.
CPC ......... *F02M 59/44* (2013.01); *F02M 2200/31* (2013.01); *F02M 2700/1376* (2013.01); *F02M 2700/1388* (2013.01)

(58) Field of Classification Search
USPC .......................................................... 123/445
See application file for complete search history.

(56) References Cited

U.S. PATENT DOCUMENTS

| | | | | |
|---|---|---|---|---|
| 2003/0164161 | A1* | 9/2003 | Usui | F02M 63/0225 417/540 |
| 2007/0107698 | A1* | 5/2007 | Usui | F04B 11/0016 123/467 |
| 2011/0110809 | A1* | 5/2011 | Inoue | F04B 1/053 417/559 |
| 2012/0247591 | A1* | 10/2012 | Kuroyanagi | F02M 59/025 137/565.01 |
| 2013/0266465 | A1* | 10/2013 | Akita | F02M 53/00 417/443 |
| 2014/0050597 | A1* | 2/2014 | Absmeier | F04B 1/00 417/244 |
| 2014/0193280 | A1* | 7/2014 | Saito | F02M 21/0245 219/121.64 |
| 2015/0017040 | A1* | 1/2015 | Hishinuma | F02M 59/02 417/540 |
| 2015/0096536 | A1* | 4/2015 | Hwang | F02M 37/0041 123/456 |
| 2016/0208796 | A1* | 7/2016 | Nigrin | F04B 43/02 |
| 2016/0230726 | A1* | 8/2016 | Dutt | F04B 11/0008 |
| 2016/0258427 | A1* | 9/2016 | Suda | F04B 19/22 |
| 2016/0298581 | A1* | 10/2016 | Nah | F16L 55/05 |
| 2017/0292485 | A1* | 10/2017 | Nah | F02M 59/02 |
| 2018/0171992 | A1* | 6/2018 | Saito | F02M 55/04 |
| 2018/0258892 | A1* | 9/2018 | Zankl | F02M 37/0041 |
| 2018/0313313 | A1* | 11/2018 | Kitajima | F04B 53/16 |
| 2019/0293037 | A1* | 9/2019 | Mikhaylov | F02M 59/102 |
| 2019/0301415 | A1* | 10/2019 | Herrmann | F02M 55/04 |
| 2020/0116141 | A1* | 4/2020 | Fitzner | F04B 45/02 |
| 2020/0332751 | A1* | 10/2020 | Hwang | F02M 55/025 |
| 2021/0231088 | A1* | 7/2021 | Iwa | F02M 59/44 |
| 2022/0082072 | A1* | 3/2022 | Usui | F04B 53/14 |
| 2022/0145838 | A1* | 5/2022 | Park | F02M 59/02 |

* cited by examiner

FUEL PUMP ASSEMBLY

CROSS-REFERENCE TO RELATED APPLICATIONS

This application is the U.S. National Stage of International Application No. PCT/EP2021/081302 filed on 10 Nov. 2021, which claims priority to and all advantages of United Kingdom Application No. 2017720.0 filed on 10 Nov. 2020, the contents of which are incorporated herein by reference.

FIELD OF THE INVENTION

This invention relates to a fuel pump assembly for use in an internal combustion engine. In particular, the invention relates to a fuel pump assembly for use in a compression ignition (diesel) internal combustion engine.

BACKGROUND

In known fuel pump assemblies, a return spring may be used to maintain contact between a plunger and a drive arrangement that drives the pumping action of a pump plunger through a pumping cycle. During the pumping cycle fuel is drawn into a pump chamber at low pressure and is delivered, once pressurised, to the downstream parts of a fuel injection system (e.g. a common rail). The drive arrangement is driven by means of an engine-driven drive shaft which typically carries a cam. Contact between the plunger and the drive arrangement may entail preserving engagement between a cam follower and the cam, for example. In pump variants employing a slipper-tappet mechanism as the drive arrangement, the return spring must maintain contact between a tappet and a rider. Contact must be maintained through the full pumping cycle, on both a pumping stroke of the plunger between bottom-dead-centre (BDC) and top-dead-centre (TDC) and on a return stroke of the plunger between TDC and BDC. The return spring must be capable of providing a return force that is sufficient to maintain contact between the plunger and its drive arrangement for all operating conditions of the pump assembly.

One problem which exists in pump assemblies of this type is that the return spring is susceptible to dynamic effects and, as the camshaft speed is increased, the force that is required to maintain contact between the plunger and the drive arrangement is increased dramatically compared to lower camshaft speeds. This requires the spring to be designed for the highest speeds that the pump could ever be driven at, as determined by the manufacturer's specification. In practice, these "overspeeds" are rarely, and sometimes never, encountered in use. In this respect, in a context of increasing demands on fuel pump designs in terms of higher pump speeds and stroke volumes, it is becoming increasingly difficult to meet the varied design constraints of providing the required dynamic force at TDC, whilst maintaining fatigue resistance over a large number of cycles.

It is against this background that the invention has been devised.

SUMMARY OF INVENTION

According to an aspect of the invention, there is provided a fuel pump assembly for an internal combustion engine, the fuel pump assembly comprising a plunger arranged to reciprocate within a plunger bore under the influence of a drive arrangement driven by means of a drive shaft, to perform a pumping cycle comprising a pumping stroke and a return stroke, the pumping stroke comprising movement of the plunger from a bottom dead centre (BDC) position to a top dead centre (TDC) position to pressurise fuel within a pump chamber, and the return stroke comprising movement of the plunger from the TDC position to the BDC position. The fuel assembly includes a spring assembly including a return spring configured to apply a return force to the plunger to effect the return stroke, wherein the return spring is cooperable, at a first end, with a first spring member coupled to the plunger and movable at a first speed dependent on the speed of rotation of the drive shaft and, at a second end, with a second spring member which is movable at a damped speed relative to the first speed so that the return spring has a variable stroke length depending on the speed of rotation of the drive shaft.

The present invention provides an advantage over known pump assemblies where the return spring has to be selected to ensure that, even for the highest and uncommon speeds of rotation of the engine, a sufficient return force is applied to ensure the plunger and the various components of the drivetrain are retained in contact with one another. As the speed of rotation of the engine increases, the force required to maintain contact between components of the drivetrain, through which drive is imparted to the plunger on rotation of the shaft, also increases and so, even though the highest of speeds are only achieved rarely, the spring must be capable of providing a high return force even when engine speeds are lower. The effect of this is that return springs are 'overdesigned' and encounter an unnecessarily high stress range for many circumstances. The present invention avoids this problem by providing a spring assembly which has a variable stroke length (i.e. provides a variable return force), depending on engine speed, so that only at the highest engine speeds is the spring at maximum compression. In this way spring life is improved considerably. The variable stroke length is achieved by damping movement of one end of the return spring, relative to the other end, by means of a damper arrangement.

The spring assembly thus typically includes a damper arrangement which acts on the second spring member to determine the damped speed of movement, with the extent of damping depending on the speed of rotation of the drive shaft.

By way of example, the damper arrangement includes a damper chamber for receiving a fluid which applies a damping force to the return spring to limit the stroke length of the return spring depending on the speed of rotation of the drive shaft.

In one embodiment, the second spring member is a spring retainer member which receives the second end of the return spring.

The spring retainer member may take the form of a shroud for receiving the second end of the return spring.

The spring retainer member may be at least partially received within the damper chamber. Typically, for example, one or more dead coils of the return spring may be received in the spring retainer member in a press fit or interference fit, or by securing the or each dead coil by means of a fastener. For example, a surface of the spring retainer member may be exposed to the contents of the damper chamber (e.g. fluid or gas).

In some embodiments, the damper arrangement may include at least one inlet and at least one outlet for allowing fluid to flow into and out of the damper chamber, respectively.

A clearance may be defined between the movable member and a wall of the damper chamber to allow fluid to flow out of the damper chamber. This may be provided in addition to, or as an alternative to, the aforementioned outlet.

In other embodiments, the damper chamber may be a sealed chamber filled with fluid or gas.

The fluid within the damper chamber may conveniently be lubricating oil, such as that used to lubricate other parts of the drivetrain for the pump assembly/engine.

Alternatively, the damper chamber may be filled with gas.

In other embodiments the spring assembly may include an additional return spring which has a fixed stroke length which does not vary depending on the speed of rotation of the drive shaft.

Also, the fuel pump assembly may comprise a tappet assembly which acts as the drive assembly.

BRIEF DESCRIPTION OF THE DRAWINGS

The above and other aspects of the invention will now be described, by way of example only, with reference to the accompanying drawings, in which.

DETAILED DESCRIPTION

It should be understood that throughout this description, references to upper and lower ends of components, and other such directional or relative references are made in relation to the orientations of the components shown in the Figures but are not intended to be limiting.

Figure 1:
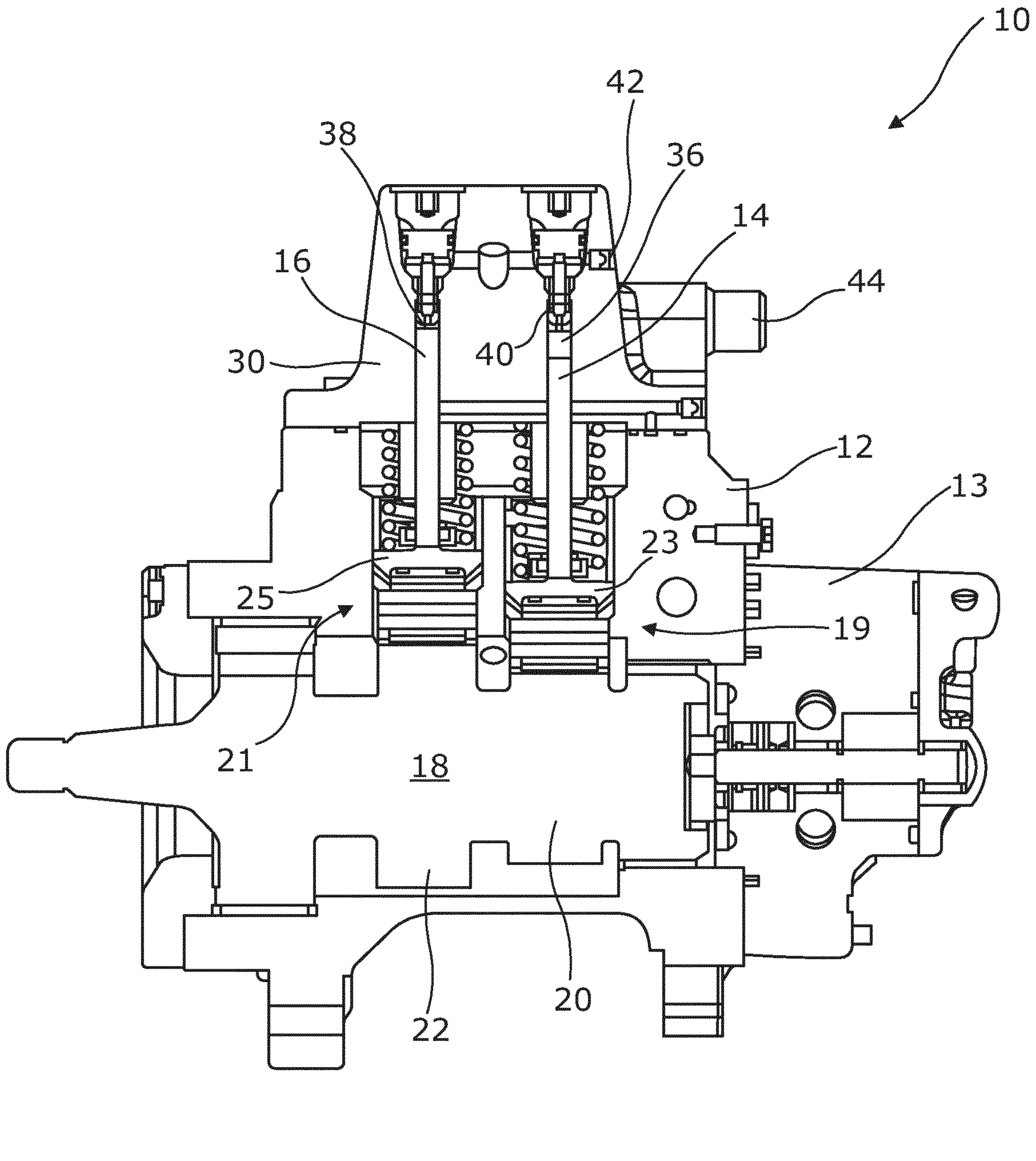
FIG. 1 is a side view of a fuel pump assembly which is known in the art.
Figure 2:
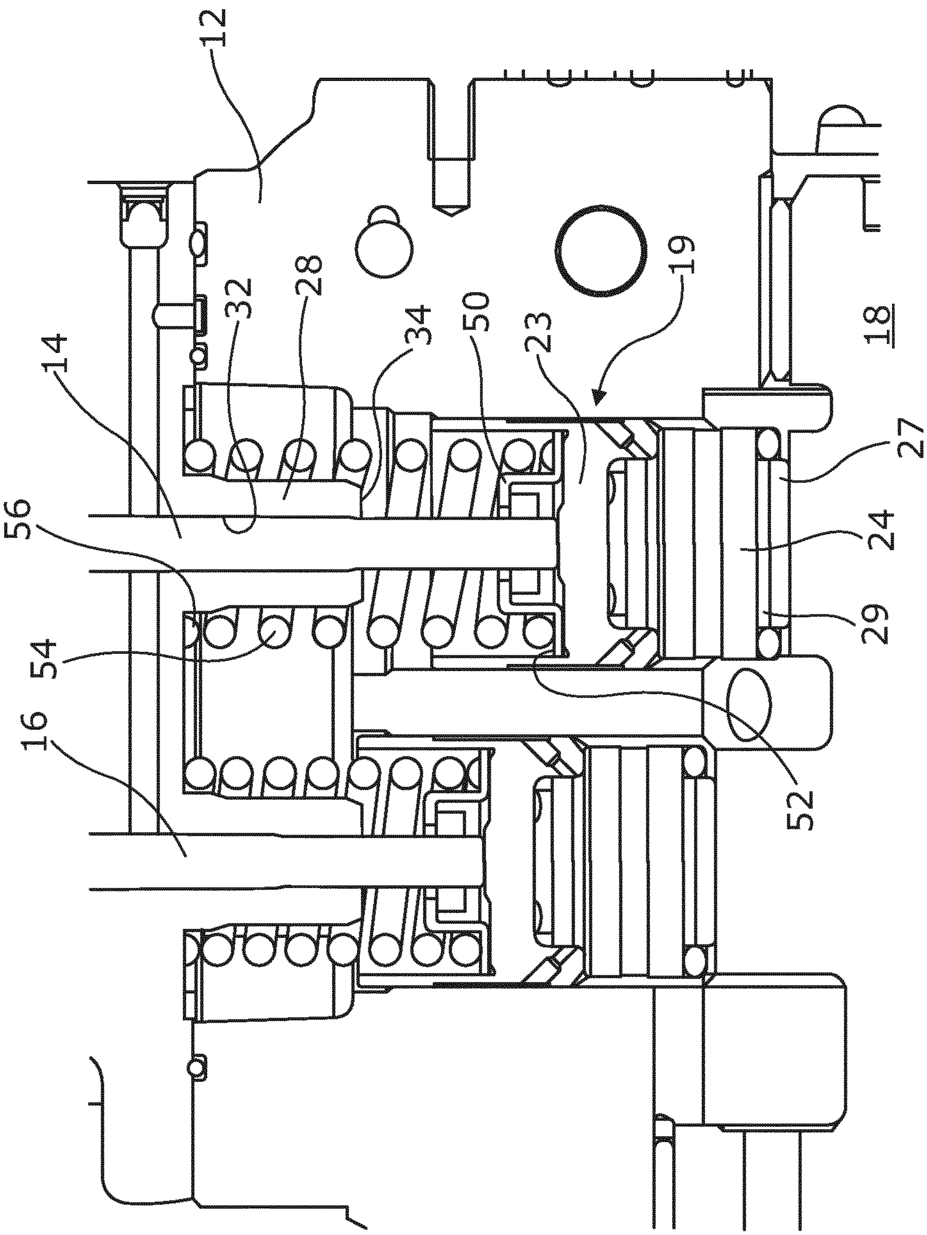
FIG. 2 is an enlarged section view of a part of the fuel pump assembly in FIG. 1.

FIGS. 1 and 2 show a known common rail fuel pump assembly 10 ("the pump" hereinafter) for use in a compression-ignition internal combustion engine. The pump 10 is an in-line pump arrangement comprising a main pump housing 12 and first and second pump elements, 14, 16 respectively, which are driven by means of a common, engine-driven drive shaft 18 which extends through the main pump housing 12 and rotates at a speed proportionate to the speed of the engine. A low pressure suction pump 13 is mounted to the side of the main pump housing 12 to deliver relatively low pressure fuel to the pump 10. The drive shaft 18 carries first and second cam drive arrangements, 20, 22 respectively, which are either mounted on, or form an integral part of, the drive shaft 18. The drive shaft 18 is reciprocally connected to each of the pump elements 14, 16 via a respective intermediate drive assembly in the form of a first or second tappet assembly, referred to generally as 19, 21. Each tappet assembly 19, 21 includes a respective tappet, 23, 25. As can be seen most clearly in FIG. 2, and describing only the first tappet assembly 19, the tappet 23 is coupled to a roller assembly consisting of a pair of hollow rollers comprising an outer roller 27 and an inner roller 29. The outer roller 27 rolls over the surface of the associated cam arrangement 20. A pin 24 secures the tappet 23 to the associated roller assembly 27, 29 and the inner roller 29 rolls on the pin 24 within the outer roller 27.

It will be appreciated that this arrangement of the tappet assembly 19, 21 and the roller assembly 27, 29 is just one example of how the drive assembly for a plunger is driven through rotation of the drive shaft 18.

It is helpful to consider the operation of the pump assembly in FIGS. 1 and 2 to understand the technical problem which the invention sets out to address. Two separate pump elements in the form of the first and second pumping plungers, 14 and 16, are shown in FIGS. 1 and 2, but for the purpose of the following description only one of the plungers 14 will be described in detail.

The first pumping plunger 14 extends through a substantially tubular turret 28 which forms a part of a pump head housing 30 mounted to the main pump housing 12. The turret 28 downwardly extends from the pump head housing 30 and defines a substantially cylindrical plunger bore 32, the turret 28 projecting into the body of the main pump housing 12 and terminating in a lower turret surface 34. The plunger bore 32 is configured to receive the plunger 14, the lower end of which extends from the turret 28.

At the uppermost end of the plunger 14 (in the illustration shown), the plunger 14 defines, together with the bore 32 in the pump head 30, a pump chamber 36 (as shown in FIG. 1) for receiving fuel to be pressurised by the plunger 14 when the pump assembly is in use. Likewise, the second plunger 16 has an associated pump chamber 38.

The pump chamber 36 is fitted with an inlet valve 40 and an outlet valve (not shown) to control, respectively, fuel flow into and out of the pump chamber 36 through the pump cycle. The configurations of such valve assemblies are well known in the art and, given that they are not central to the invention, will not be described in detail here, save that they are used to control flow of the fuel from a pump inlet 42 through to the pump chamber 36 and from the pump chamber 36 through to a pump outlet 44 to the common rail (not shown). Each valve includes a spring (not identified), which acts to close the valve to prevent the passage of fuel therethrough.

The plunger 14 is moveable between a bottom-dead-centre positon (hereinafter, "BDC position") and a top-dead-centre position (hereinafter, "TDC position"), defining a pumping stroke, and between the TDC position and the BDC positon, defining a return stroke. A pumping stroke followed by a return stroke defines a pumping cycle for the plunger 14 and pump assembly 10. FIG. 2 shows the plunger 14 on the right hand side of the assembly with the plunger at the BDC position, while the plunger 16 on the left hand side of the assembly is moving towards TDC position.

A spring abutment member in the form of an annular spring plate 50 forms a collar around the plunger 14 in a lower region of the plunger and is attached thereto such that their respective motions are coupled together. The spring plate 50 defines an abutment surface 52 for one end of a plunger return spring ("return spring" hereinafter) 54 in the form of a helical coil spring. Accordingly, the spring plate 50 acts as a seat member for the return spring 54. The other end of the return spring 54 engages a fixed abutment surface defined by the underside of the pump head housing 30. The return spring 54 is thus permanently engaged with both the spring plate 50 and the pump head housing 30.

When the plunger is in the TDC position (as for the left hand plunger 16 in FIG. 2), both the inlet and outlet valves, 40, 42 to the respective pump chamber 36 are closed, thereby preventing fuel from flowing into or out of the pump chamber 36. As the drive shaft 18 rotates and the tappet assembly 19 rides over the cam 20, the return spring 54 acts on the plunger 14 to urge the plunger 14 away from the TDC position, through the return stroke to the BDC position. This causes an increase in the volume of the pump chamber 36, decreasing the pressure within it and establishing a pressure drop across the inlet valve 40. This pressure drop allows the inlet valve 40 to open against the force of the inlet valve spring and fuel enters the pump chamber 36 until the pressure across the inlet valve 40 equalizes, causing it to close. This typically occurs just after the plunger 14 reaches the BDC position. During the return stroke the fuel is supplied to the pump chamber 36 at a pressure of around 3 bar (300 kPa). Throughout the return stroke the return spring 54 serves to ensure that contact is maintained between the various drivetrain components, including maintaining contact between the plunger 14 and the tappet assembly 19 and between the tappet assembly 19 and the cam 20.

Once the plunger 14 reaches the BDC position, it begins the pumping stroke as the drive shaft 18 continues to rotate. During the pumping stroke fuel in the pump chamber 36 is pressurised as the volume of the pump chamber 36 is reduced with the advancing plunger 14. During this phase of operation the inlet valve 40 of the pump chamber 36 is caused to close due to the pressure drop across it and the pressure in the pump chamber 36 is increased, typically to at least 200 bar (20 MPa) and sometimes as high as 2500 bar (250 MPa). A pressure drop is created across the outlet valve (not shown), allowing it to open against the force of the outlet valve spring and fuel exits the pump chamber 36 and flows into the common rail fuel volume. As the plunger 14 reaches the TDC position, the pressure across the outlet valve (not shown) equalizes, causing it to close.

Throughout the pumping stroke the force from the return spring 54 continues to act through the drivetrain components to ensure contact is maintained between the tappet 23, the shoe 24 and the cam 20, whilst importantly minimising slippage between the shoe 24 and the cam 20. Similarly, in pumps incorporating a slipper-tappet mechanism as part of the drive arrangement, the return spring 54 must maintain sufficient force between the tappet 23 and a cam rider, or 'slipper', to avoid rotation of the rider relative to the housing.

One problem which occurs in the aforementioned pump assembly is that the helical compression springs which are used for the return spring 54 are highly susceptible to dynamic effects. As the speed of rotation of the drive shaft 18 increases, the force which is required to maintain contact between the drivetrain components increases drastically. This means that the return spring 54 must be designed for the highest speed of operation that the pump could ever be subjected to, as determined by the engine manufacturer's specification. In practice, these "overspeeds" are rarely, and sometimes never, encountered in use. As the spring force is proportional to the stress in the return spring 54, the stress range for the return spring 54 increases with the stroke of the spring: the "stroke length" of the return spring is defined, for any given stroke of the plunger, as the extension of the spring from its minimum length of extension (when fully compressed at TDC) to its maximum length of extension (when fully expanded at BDC). In other words, when the stroke of the return spring 54 is greater, the stresses in the return spring 54 are higher.

In the existing pump shown in FIGS. 1 and 2, the return spring 54 must travel through its full stroke for all speeds of the drive shaft 18. These strokes of the return spring 54 contribute to a reduction in the fatigue life of the return spring 54: often the return spring 54 dictates the overall lifetime and reliability of the whole pump assembly. However, at lower speeds the requirement for the force from the return spring 54 is lower, so it would be possible for the spring to have a reduced stroke in the lower-speed range, which would reduce spring stresses for at least some circumstances of pump operation.

The present invention solves this problem through the pump assembly shown in and described with reference to FIGS. 3 to 6.

Referring to 3, an embodiment of the pump assembly of the invention includes similar parts to those described previously, with reference to FIGS. 1 and 2, with the exception of the arrangement of the return spring and how this functions. Similar parts to those described previously will be referred to with like reference numerals, increased by 100. As described previously for FIGS. 1 and 2, the plunger 14 carries a first spring member in the form of a spring abutment plate 150 at its lower end with which one end 62 of the return spring 154 is engaged. At the other end 64 of the return spring 154, remote from the spring plate 150, the spring 154 is received within a second spring member in the form of a spring retainer member 70. The spring retainer member takes the form of an annular shroud 70.

The shroud 70 has an open end which opens downwardly in the illustration shown, towards the spring abutment plate 150, and a closed end which defines an internal abutment surface 76. The shroud 70 defines an internal receiving volume 72, with the end 64 of the spring 154 being received within the receiving volume 72 and being in abutment with the internal abutment surface 76. The return spring 154 is therefore compressed between the abutment surface 152 of the spring plate 150 and the internal abutment surface 76 of the shroud 70.

The shroud 70 defines a movable abutment member for the return spring 154 and forms a part of a damping arrangement, referred to generally as 80, further including a hollow annular member 82. The annular member 82 is carried by the turret 128 on the pump head and is open at one end and closed at the other, with the open end facing the spring 154. A damper chamber 84 is defined within the annular member 82 and is defined by a cylindrical wall of the annular member 82. The shroud 70 is at least partially received within the annular member 82 in a slidable manner: the extent to which the shroud 70 is received in the damper chamber 84 depends on engine speed as described further below. The shroud 70 therefore forms a 'plug' at the open end of the annular member 82, with the position of the shroud 70 within the annular member 82 being variable. The end 64 of the return spring 54 is securely coupled to the shroud 70 so that neither one can move relative to the other. For example, the end 64 of the spring 154 may be received within the shroud 70 in an interference fit or the dead coils (i.e. the coils which are not active) at the end 64 of the spring may be fastened inside the shroud 70 using fasteners to attach the shroud 70.

A clearance gap 88 exists between the inner surface of the wall of the damper chamber 82 and the outer surface of the shroud 70 to allow minimal leakage of fluid from the damper chamber 84, as described further below. Different positions for the shroud 70 within the damper chamber 84 can also be seen by comparing FIGS. 5 and 6, discussed below.

Figure 3:
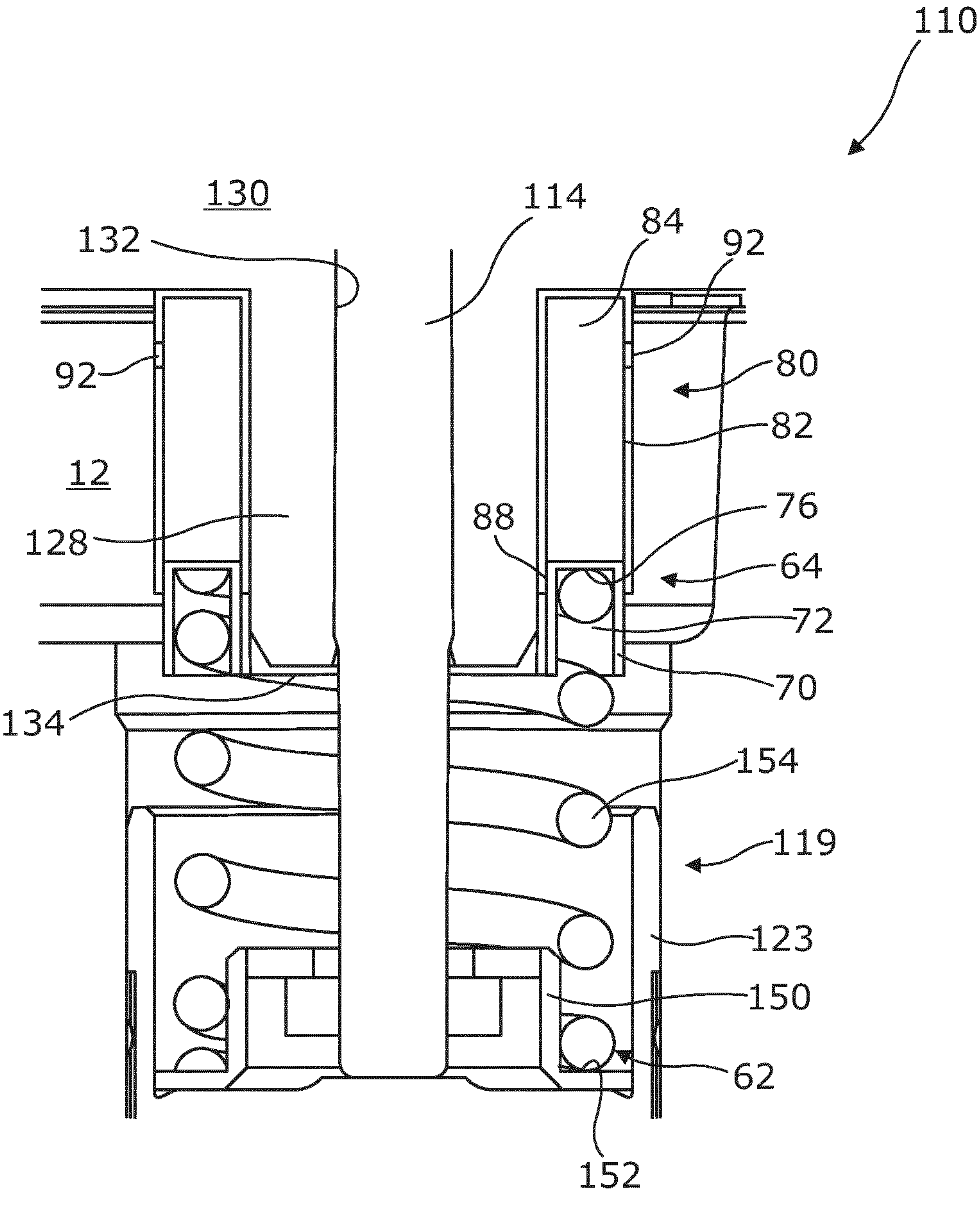
FIG. 3 is an enlarged section view, similar to that shown in FIG. 2, but for a first embodiment of the invention, to illustrate a damping arrangement of the invention.
Figure 4:
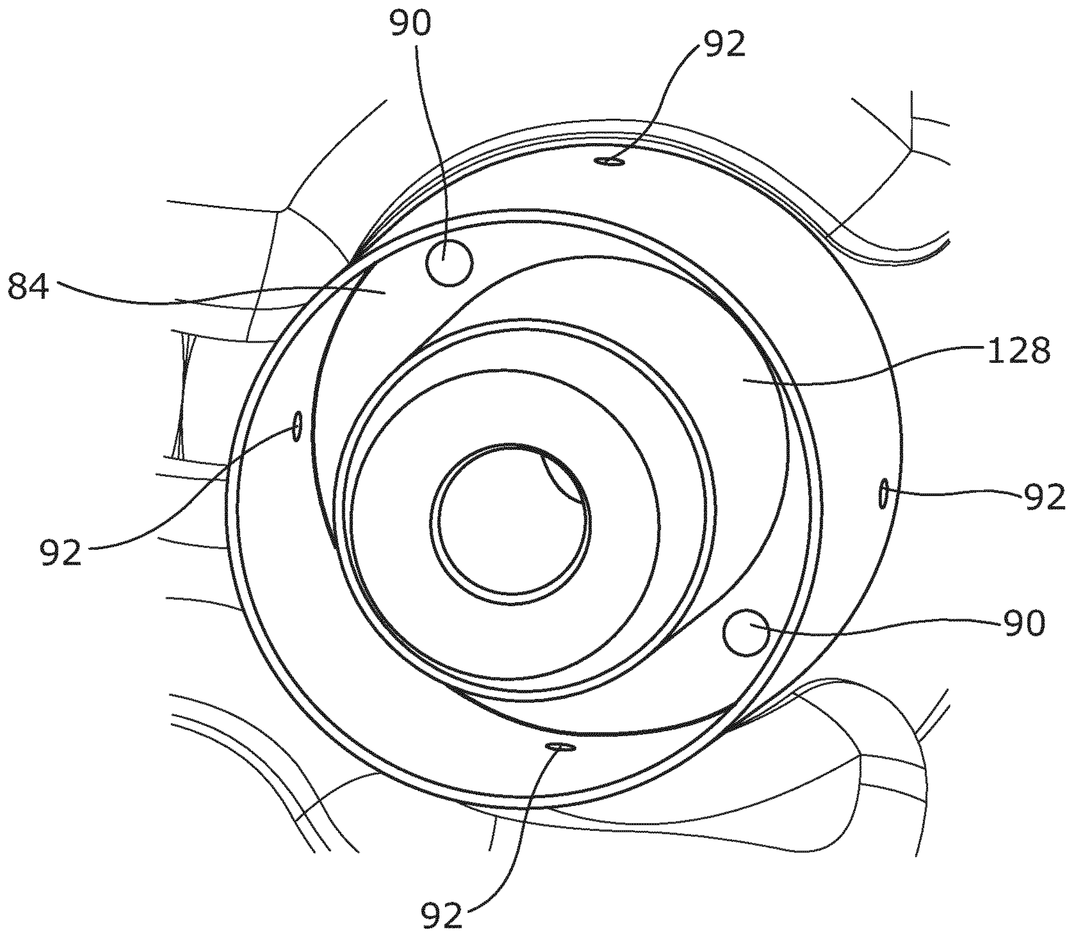
FIG. 4 is a perspective view of the underside of the plunger bore of the fuel pump assembly of the invention, to illustrate outlet ports and inlet ports for the damping arrangement shown in FIG. 3.

Referring to FIG. 4 (in which the plunger and the attached components are hidden), the damper chamber 84 is filled with lubricating fluid in the form of engine oil which is delivered to the chamber 84 via inlet or feed ports 90 provided in the underside of the pump head housing 130 (the inlet ports are not visible in FIG. 3) when the volume of the pump chamber 36 is expanding through the return stroke. Two inlet ports 90 are provided in the underside of the pump head housing 36, at diametrically opposed positions around the circumference of the turret 128. A plurality of outlet ports 92 are provided in the wall of the damper chamber 84 to allow lubricating fluid within the damper chamber 84 to be ejected from the damper chamber 84 when the chamber volume is compressed during the pumping stroke.

In FIG. 3, only two of the outlet ports 92 are visible in the cross section, whereas in FIG. 4 all four of the outlet ports 92 are visible. In practice the number of inlet and outlet ports 90, 92 may vary, depending on the particular configuration of the pump assembly and the material properties of the fluid within the damper chamber 84. In one embodiment, the lubricating fluid takes the form of engine oil which is used to lubricate other parts of the drivetrain for the pump assembly. This provides a particularly convenient solution for routing the lubricating fluid into and out of the damper chamber 84, relative to other parts of the pump assembly 110 which require lubrication. In other embodiments, other lubricating fluids may be used, or even gas, as described further below.

Figure 5:
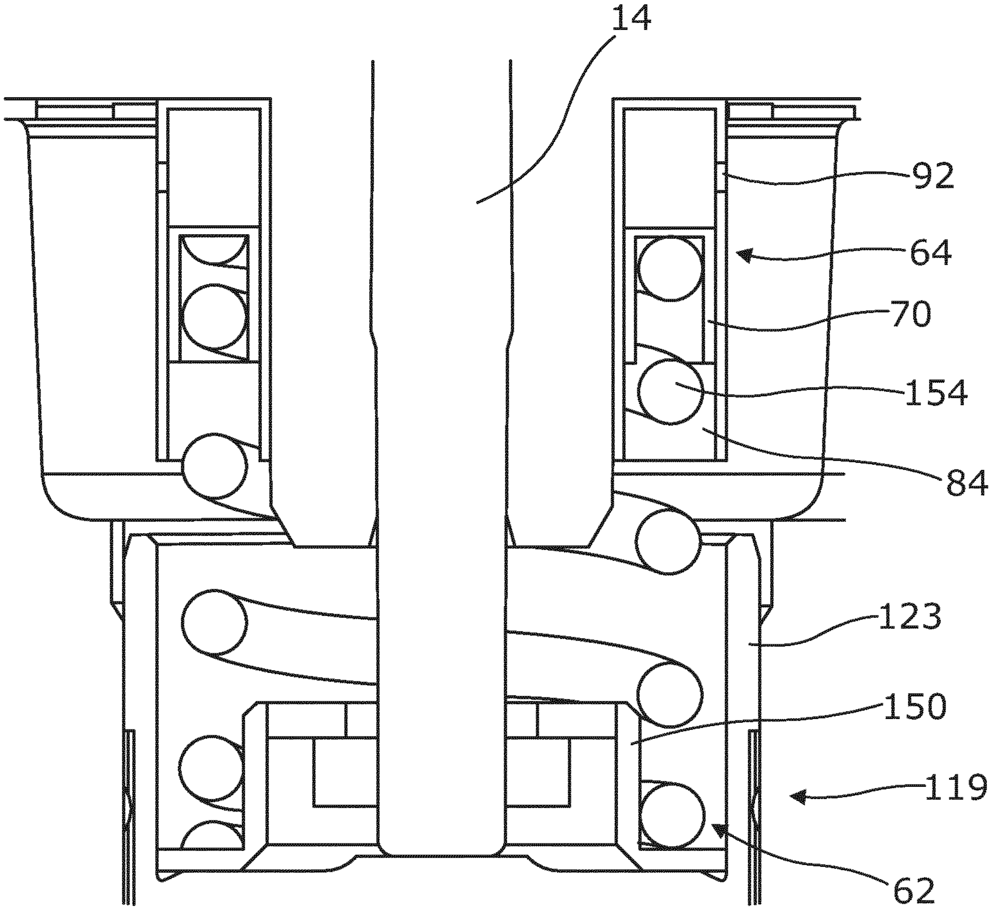
FIG. 5 is an enlarged section view of a part of the fuel pump assembly of the embodiment in FIG. 3, when the pump assembly is driven at a first, lower speed.
Figure 6:
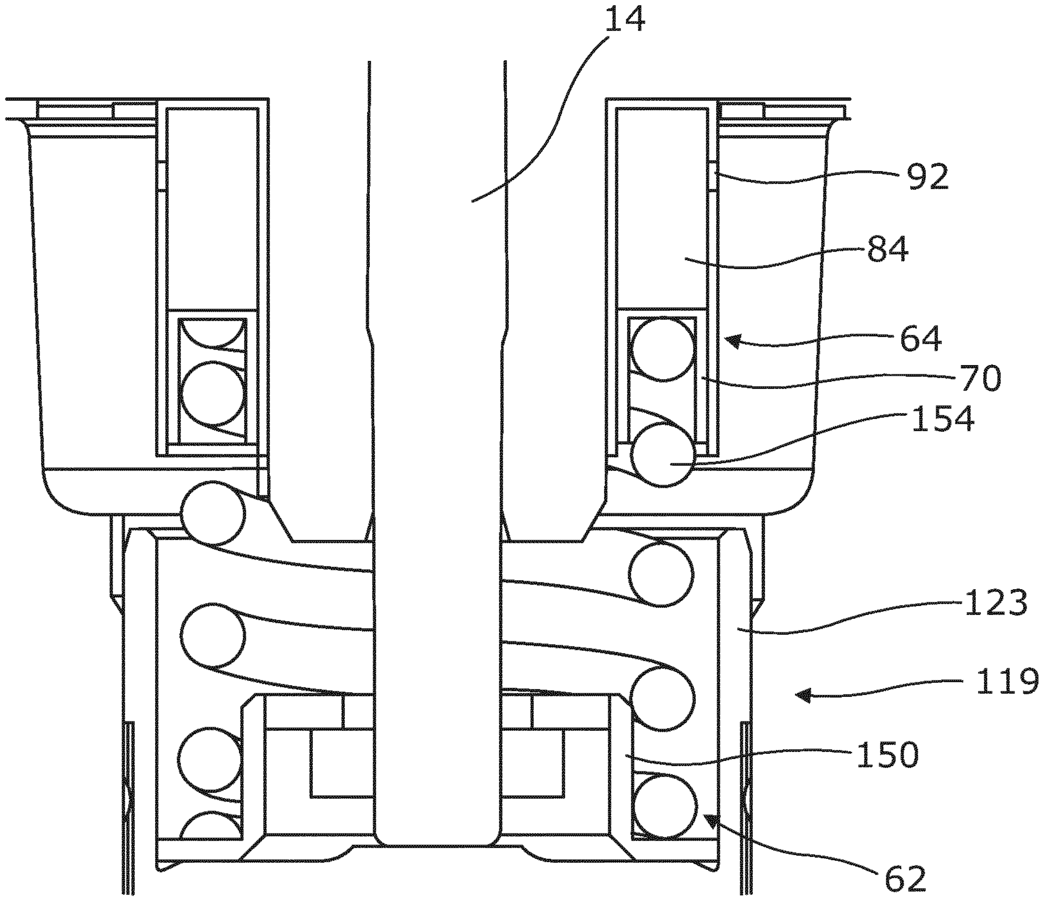
FIG. 6 is an enlarged section view of a part of the fuel pump assembly of FIG. when the pump assembly is driven at a second, higher speed.

As described above, the plunger 114 undergoes pumping cycles in use, each cycle comprising a pumping stroke and a return stroke. FIGS. 5 and 6 shows the pump assembly 110 with the plunger at the TDC position at the end of the pumping stroke. The force applied to the spring plate 150 by the return spring 154 varies approximately sinusoidally with rotation of the cam 20, with extremes of the force being applied at the TDC and BDC positions and with maximum force being provided at the TDC position when the return spring 154 is maximally compressed (as shown in FIGS. 5 and 6).

Referring to FIG. 5, the drive shaft 18 is rotating at a relatively low speed and, as the plunger 114 moves up the plunger bore 132 during the pumping stroke towards the TDC position, the spring plate 150, being affixed to the plunger 114, moves towards the lower surface 134 of the turret 128. The spring plate 150 moves at a first speed dependent on the speed of rotation of the drive shaft 18. As the spring plate 150 moves towards the lower surface 134 of the turret 128, the return spring 154 is progressively compressed. The shroud 70, containing the upper end 64 of the return spring 154, is displaced upwardly into the damper chamber 84, causing fluid to be 'squeezed out' or displaced through the outlet ports 92 and through the clearance 88 defined between the shroud 70 and the chamber wall.

Because the plunger 114 is only moved upwards relatively slowly (with the drive shaft rotating at a relatively low speed), the volume of fluid displaced from the damper chamber 84 through the outlet ports 92 is relatively high, with a relatively long time being available for fluid to be displaced during the pumping stroke (at lower speeds). The force due to remaining fluid within the damper chamber 84, which acts against the moving shroud 70, and hence the return spring 154, is therefore relatively low throughout the pumping stroke so that the return spring 154 compresses relatively little. The speed of movement of the shroud 70 in this phase is damped, relative to the speed of movement of the lower end 64 of the spring 154 at the spring plate 150, but with only relatively little damping. As a result of this limited compression of the spring 154, the force due to the return spring 154 which acts through the spring abutment plate 150 and the drivetrain components (the tappet assembly 119, the roller assembly 27, 29 and the pin 24), and onto the cam 20, is relatively low. Nevertheless, as the speed of rotation of the drive shaft 18 is relatively low, the force is still sufficient to retain the components of the drive train in contact with one another. In other words, the return force applied by the return spring 154, which acts through the spring plate 150, to the tappet assembly 119 and through the roller assembly (not identified in FIG. 5) to the cam, is sufficient to ensure that all of these parts remain in contact with neighbouring parts as the plunger retracts through the return stroke, and so there is no impact damage caused due to parts "lifting off", or separating and subsequently reconnecting.

Referring to FIG. 6, at higher speeds of rotation of the drive shaft 18, the plunger is driven upwardly at a higher speed so that the volume of fluid within the damper chamber 84 which, during the return stroke, is able to exit the outlet ports 92 and through the clearance between the shroud 70 and the chamber wall, is reduced compared to lower speeds as there is a relatively short time for fluid to be displaced from the damper chamber 84. As a result, the force of the remaining fluid within the damper chamber 84, which opposes the moving shroud 70, is higher so that the upward displacement of the shroud 70 is less than for lower speeds of drive shaft rotation, with the shroud moving at a more heavily damped speed compared to the lower speed scenario of FIG. 5. The return spring 154 is therefore compressed by a relatively large amount for higher speeds of drive shaft rotation, compared to the extent of compression of the return spring 154 for lower speeds. As a result, the force of the return spring 154 which acts through the spring abutment plate 150 and the drivetrain components (the tappet assembly 119, the roller assembly 27, 29 and the pin 24), and onto the cam, is relatively high for higher engine speeds. Thus, as for the lower speed scenario, any impact damage of parts of the drive train is avoided.

The extent to which the return spring 154 is compressed is often referred to as the "stroke" of the spring, being a measure of the difference between the length of the spring at the BDC position (when fully expanded) compared to its length at the TDC position (when fully compressed for that stroke). It will be appreciated that the speed of movement of the shroud 70, which moves at a damped speed relative to movement of the lower end 64 of the spring 154, is dependent or set by the extent of the fluid that is displaced from the damper chamber 84. In practice this damping effect, or the damping force applied to the shroud 70 due to the fluid in the chamber 84, is dependent on the square of the velocity (V) of the moving drive assembly 119 (the well known "drag equation") so that there is an increasing damping effect on the shroud 70 as the speed of rotation increases, thereby causing the return spring 154 to be compressed by a greater amount for higher speeds (and thus providing a higher return force).

Although at lower speeds the return spring 154 is compressed less at the TDC position, and the loading of the abutment plate 150 onto the tappet 123 and other components of the drive train is reduced through the return stroke, because the speed of rotation of the shaft is lower the reduced force imparted by the return spring 154 is still sufficient to ensure contact is maintained between the drive train parts. However, a benefit is obtained because the return spring 154 is compressed to a lesser amount at the TDC position, dependent on speed of cam rotation, compared to the situation where the maximum compression is achieved for every stroke (regardless of the speed of cam rotation). The reduction in the stroke of the return spring 154 for lower speeds of rotation of the drive shaft means there is a lower alternating stress within the return spring 154 depending on engine speed, yielding a higher fatigue life for the spring.

At the TDC position, the volume of the pump chamber 36 is at its minimum volume and fuel pressure within the pump chamber 36 is pressurised to a sufficiently high level to cause the pump outlet valve to open, delivering pressurised fuel to the downstream parts of the fuel injection system. Through the subsequent return stroke, the return spring 154 applies a return spring force to the plunger 114, via the abutment plate 150, which serves to drive the plunger 114 towards the BDC position, being a reduced force when the speed of rotation of the drive shaft is lower. Through the return stroke, the volume of the pump chamber 36 is expanded so that fuel at relatively low pressure is drawn into the pump chamber 36 through the inlet valve (40 in FIG. 1), ready for pressurisation in the subsequent pumping stroke.

As the plunger 114 is withdrawn from the plunger bore 132 during the return stroke there is a continual supply of lubricating fluid into the damper chamber 84 through the inlet ports 90, and the ejection of fluid through the outlet ports 92, and through the clearance between the shroud 70 and the chamber wall, eases as the shroud 70 is drawn downwards to increase the volume of the damper chamber 84.

It will be appreciated that in order to ensure there is a sliding fit between the shroud 70 and the internal wall of the damper chamber 84, a small amount of leakage fluid from the damper chamber 84 will occur through the pump cycle through the clearance gap 88 between the outer surface of the shroud 70 and the inner surface of the annular chamber 82. In another embodiment (not shown), if the clearance gap 88 between the damper chamber 84 and the outer surface of the shroud 70 is sized correctly, it is possible to avoid providing the outlet ports 92 in the wall of the damper chamber 84 altogether and for the outflow of fluid from the damper chamber 84, during the pumping stroke, to be governed only by the rate of flow of fluid through the clearance gap 88. In any case, it is important that the quantity of damper fluid within the damper chamber 84 is maintained through the inflow of fluid through the inlet ports 90, so the clearance gap 88 cannot be too large.

In another embodiment of the invention, the damper chamber 84 need not be formed within a separate component (annular member 82) consisting of the walled chamber shown in FIGS. 3, 5 and 6 and, instead, the damper chamber 84 may be formed directly within the pump head housing 130 by removing an annular region of the turret 128. However, this may be less desirable as it requires the expensive, hard material of the turret 128 to be discarded after is has been formed which may not be cost effective.

In another embodiment of the invention, it is possible to remove the inlet and outlet ports 90, 92 to the damper chamber 84 altogether so that the damper chamber is sealed. However, this solution would require the use of a low profile seal for the chamber 84 which may not be desirable.

Other embodiments of the invention may fill the damper chamber 84 with a gas, rather than the lubricating fluid such as the fluid which serves to lubricate other components of the drive train.

Although in the embodiments described above a spring plate 150 is provided as a separate component that is attached to the plunger 114, it would be possible to form the spring plate 150 integrally with the plunger 114.

In still further embodiments it is possible to provide an additional spring (not shown) to the return spring of previous embodiments, but one which has a fixed stroke length regardless of the speed of rotation of the drive shaft. In this case the additional return spring may be arranged around the turret 128 to engage with the underside of the pump head (i.e. a fixed abutment surface for the return spring) and a surface of the spring abutment plate 150. However, the use of an additional spring adds cost to the assembly which may be undesirable.

It will be appreciated by a person skilled in the art that the invention could be modified to take many alternative forms to that described herein, without departing from the scope of the appended claims.

REFERENCES USED

10, 110—fuel pump assembly
12—main pump housing
14, 114—plunger
16—plunger
18—drive shaft
20—first cam
22—second cam
19, 119—first tappet assembly
21, 121—second tappet assembly
23, 123—first tappet
25—second tappet
24—pin
27—outer roller
29—inner roller
28, 128—turret
30, 130—pump head housing
32, 132—plunger bore
34—lower surface of turret
36—pump chamber
40—inlet valve
42—pump inlet
44—pump outlet
50, 150—spring abutment plate
52, 152—abutment surface of spring abutment plate
54, 154—return spring
56—underside of pump head housing
62—lower end of spring
64—upper end of spring
70—shroud
72—receiving volume of shroud
76—internal surface of shroud
80—damper arrangement
82—wall of annular member of damper arrangement
84—damper chamber
88—clearance gap
90—inlet ports to damper chamber
92—outlet ports to damper chamber

The invention claimed is:

1. A fuel pump assembly for an internal combustion engine, the fuel pump assembly comprising:

a plunger arranged to reciprocate under the influence of a drive assembly driven by means of a drive shaft, to perform a pumping cycle comprising a pumping stroke and a return stroke, the pumping stroke comprising movement of the plunger from a bottom dead centre (BDC) position to a top dead centre (TDC) position to pressurise fuel within a pump chamber, and the return stroke comprising movement of the plunger from the TDC position to the BDC position, a spring assembly including a return spring configured to apply a return force to the plunger to effect the return stroke, wherein the return spring is cooperable, at a first end, with a first spring member coupled to the plunger and movable at a first speed dependent on the speed of rotation of the drive shaft and, at a second end, with a second spring member which is movable at a damped speed relative to the first speed so that the return spring has a variable stroke length depending on the speed of rotation of the drive shaft; and a damper arrangement which acts on the second spring member to set the damped speed, wherein the damper arrangement includes a damper chamber for receiving a fluid which applies a damping force to the return spring, and wherein the damper arrangement includes at least one outlet provided in a wall of the damper chamber for allowing fluid out of the damper chamber, and a clearance gap defined between the second spring member and the wall of the damper chamber to allow the fluid to flow out of the damper chamber.

2. The fuel pump assembly as claimed in claim 1, whereby the damping force applied to the return spring serves to limit the stroke length of the return spring depending on the speed of rotation of the drive shaft.

3. The fuel pump assembly as claimed in claim 2, wherein the second spring member is a spring retainer member which receives the second end of the return spring.

4. The fuel pump as claimed in claim 3, wherein the return spring is a coil spring which includes at least one dead coil which is received within the second spring member in an interference or press fit to retain the return spring relative to the second spring member.

5. The fuel pump assembly as claimed in claim 1, comprising a tappet assembly which acts as the drive assembly.

6. The fuel pump assembly as claimed in claim 2, wherein the damper arrangement includes at least one inlet for allowing fluid to flow into the damper chamber.

7. The fuel pump assembly as claimed in claim 2, wherein the fluid which provides the damping force is a lubricating oil.

8. The fuel pump assembly as claimed in claim 2, wherein the fluid which provides the damping force is a gas.

9. The fuel pump assembly as claimed in claim 3, wherein the spring retainer member takes the form of a shroud for receiving the second end of the return spring.

10. The fuel pump assembly as claimed in claim 3, wherein the spring retainer member is at least partially received within the damper chamber.

* * * * *